(12) United States Patent
Iwamoto

(10) Patent No.: US 6,932,103 B2
(45) Date of Patent: Aug. 23, 2005

(54) ATTACHING STRUCTURE FOR VALVE DEVICE

(75) Inventor: Takashi Iwamoto, Machida (JP)

(73) Assignee: Nifco Inc., Yokohama (JP)

( * ) Notice: Subject to any disclaimer, the term of this patent is extended or adjusted under 35 U.S.C. 154(b) by 145 days.

(21) Appl. No.: 10/611,885

(22) Filed: Jul. 3, 2003

(65) Prior Publication Data
US 2004/0086331 A1 May 6, 2004

(30) Foreign Application Priority Data
Oct. 21, 2002 (JP) .................................. 2002-305372

(51) Int. Cl.⁷ .............................................. F16K 24/04
(52) U.S. Cl. ...................................... 137/202; 137/587
(58) Field of Search ................................. 137/202, 587

(56) References Cited
U.S. PATENT DOCUMENTS
4,989,629 A * 2/1991 Shirakawa .................. 137/202
5,277,217 A * 1/1994 Kobayashi et al. ......... 137/202
5,954,083 A * 9/1999 Hattori ....................... 137/202
6,062,250 A * 5/2000 Takahashi ................... 137/202

FOREIGN PATENT DOCUMENTS
JP          7-35255      2/1995
JP          11-321354    11/1999

* cited by examiner

Primary Examiner—Gerald A. Michalsky
(74) Attorney, Agent, or Firm—Manabu Kanesaka

(57) ABSTRACT

A valve device is detachably attached to a functional component disposed at an upper inside portion of a fuel tank. An attaching device is fixed to the functional component for attaching the valve device inside the fuel tank. The valve device includes a connecting pipe portion and is disposed at the upper inside portion of the fuel tank so that the outside and the inside of the fuel tank are communicated through the connecting pipe portion. The valve device is closed when a fuel level increases.

10 Claims, 5 Drawing Sheets

ATTACHING STRUCTURE FOR VALVE DEVICE

BACKGROUND OF THE INVENTION AND RELATED ART STATEMENT

The present invention relates to an attaching structure for a valve device to be installed in a fuel tank, in particular, an attaching structure suitable for a plurality of valve devices to be installed in a fuel tank.

Various valve devices are attached to an upper portion of a fuel tank to be installed in a vehicle or the like for the purpose of, for example, discharging fuel vapor generated in the tank to the side of a canister, or preventing the fuel from leaking when a car body is inclined or fallen down. FIGS. 6 and 7 show attaching structures of the valve device as described above.

FIG. 6 shows an attaching structure of a valve device disclosed in Japanese Patent Publication (KOKAI) No. 07-35255. In the attaching structure, a valve device 50 includes an engagement portion 52 provided on an upper portion of a housing 51 and a connecting pipe portion 53 disposed on a sidewall of the housing 51. The valve device 50 is attached to an upper surface 61 of the tank 60 through a bracket 65. The bracket 65 is a substantially flat metal plate, and welded to the upper surface 61 of the tank. The bracket 65 constitutes an engagement portion 66 corresponding to the engagement portion 52. The valve device 50 is attached in a suspending state through engagement between the engaging portion 52 and the engagement portion 66. A connecting pipe portion 53 is connected to a pipe 70 communicating the inside of the tank with the outside thereof.

FIG. 7 shows an attaching structure of a valve device disclosed in Japanese Patent Publication (KOKAI) No. 11-321354. In the attaching structure, a valve device 55 includes a connecting pipe portion 57 with a large diameter disposed on an upper portion of a housing 56, and notch grooves 58 formed on both sides around the connecting pipe portion 57. The valve device 55 is attached to an upper surface 63 of a tank 62 through a bracket 67. The bracket 67 has a substantially L-shape. A vertical plate of the L-shape includes an opening for receiving the connecting pipe portion 57 and an engagement claw inserting inside through the notch groove 58. A horizontal plate of the L-character shape is fixed to an upper surface 63 in the tank.

The valve device 55 is attached to the opening of the vertical plate of the bracket 67 in a state that a corresponding end of a pipe 71 for communicating the outside and the inside of the tank is inserted into the connecting pipe portion 57. In this state, the engaging claw enters the connecting pipe portion 57 through the notch groove 58 to fix the corresponding end of the pipe 71 not to come off. As an attaching structure other than the above-mentioned structures, in a case that a fuel tank is made of a resin, the valve device may be directly welded to the upper portion of the tank.

In the conventional attaching structures for the valve devices as described above, each attaching structure is attached to the upper surface of the fuel tank through the bracket, or welded to the resin tank. Thus, there have been the following problems with respect to producing a tank. First, in the valve device, since the connecting pipe portion communicating with the outside is integrated with the housing, it is very difficult to change a position of the connecting pipe portion while the valve device is attached to the tank.

For this reason, in the installation work, it is difficult to accurately position the pipe (normally, the pipes 70, 71 are made of metal) in the tank. Further, it is not easy to remove the bracket, thereby deteriorating the workability. Also, the fuel tank for the vehicle has been designed in a more complicated shape according to an installation area in a car body or for increasing an effective capacity of the tank. Also, there has been a trend that the number of the valve devices has been increasing. Along with this trend, from a design point of view, it may be difficult to provide a tank with a large flat area for installing the valve device, or there are problems related to other functional components and their installation areas on the tank. Incidentally, in a case that the valve devices are welded or fused, when an abandoned fuel tank is scrapped, the separation work becomes a problem.

In view of the above defects, the present invention has been made, and an object of the invention is to provide an attaching structure for a valve device, wherein an attaching workability is improved, and, also a flexible installation is achieved.

Further objects and advantages of the invention will be apparent from the following description of the invention.

SUMMARY OF THE INVENTION

In order to attain the above objects, according to the present invention, a valve device includes a connecting pipe portion and is attached to an upper inside portion of a fuel tank so that the outside and the inside of the fuel tank are communicated through the connecting pipe portion and the valve device is closed when a fuel level rises. The valve device may be detachably attached to other functional components disposed at the upper inside portion of the fuel tank.

The present inventors have found, based on studies and repeated tests, that even though the valve device is not attached to the fuel tank directly or through a bracket, it is possible to attach the valve device with sufficient strength and stable holding force. Further, with the attaching structure of the invention, it is possible to solve the problems associated with the conventional attaching structure. In other words, the invention has been made out of the conventional design in which the valve device is directly attached to the upper surface of the fuel tank. At the same time, the invention utilizes functional components such as various pipes and the like as the attaching members. As a result, it is possible to improve attaching workability, and flexibility of the valve device in installation and design.

With respect to the attaching workability, since the engagement structure is employed instead of the conventional welding and fusing, the workability is improved without a risk of damaging the tank. With respect to the installation flexibility, the valve device is easily attached to and detached from the bracket as well as with respect to the functional components together with the bracket, thereby improving the flexibility in installing the valve device in the tank and in maintaining the device. With respect to the design flexibility, since the functional components are attached to the valve device, it is not limited by the shape of the tank, and it is easy to accommodate with other valve devices and functional components.

The present invention may be embodied according to the following second to fifth aspects of the invention.

According to the second aspect of the invention, in a case that the functional component is a metal pipe disposed in the fuel tank, a load of the valve device can be held without problem, and the engagement structure of the pipe is simplified. Other types of metal pipes may be used other than a pipe connecting a plurality of the valve devices. In other words, any metal pipes disposed in the fuel tank or other suitable members may be used.

According to the third aspect of the invention, the connecting pipe portion is connected to an end side of a tube for connecting the inside of the fuel tank to an upper portion of a fuel filler pipe attached to the fuel tank.

According to the fourth aspect of the invention, the valve device is attached to the functional component through an elastic bracket (a thin plate metal bracket and the like). Accordingly, it is possible to reduce an influence of vibration or clash impact of the vehicle.

According to the fifth aspect of the invention, the bracket is formed of a horizontal plate portion and a vertical plate portion integrated with the horizontal plate portion. One of the plate portions has an engagement portion that is detachable to an engagement portion disposed on a housing side of the valve device. The other of the plate portions has a connecting portion detachably connected to the corresponding portion of the functional component. As a result, the attaching ability and maintaining ability are improved. Further, when the fuel tank is scrapped, it is easy to do separation work according to materials.

DETAILED DESCRIPTION OF PREFERRED EMBODIMENTS

Hereunder, embodiments of the present invention will be explained with reference to the accompanying drawings. In the following explanation, an outline of a valve device and a fuel tank according to the present invention will be described first. Then, an attaching structure of the valve device, and an operation and advantages thereof will be described next.

Figure 1:
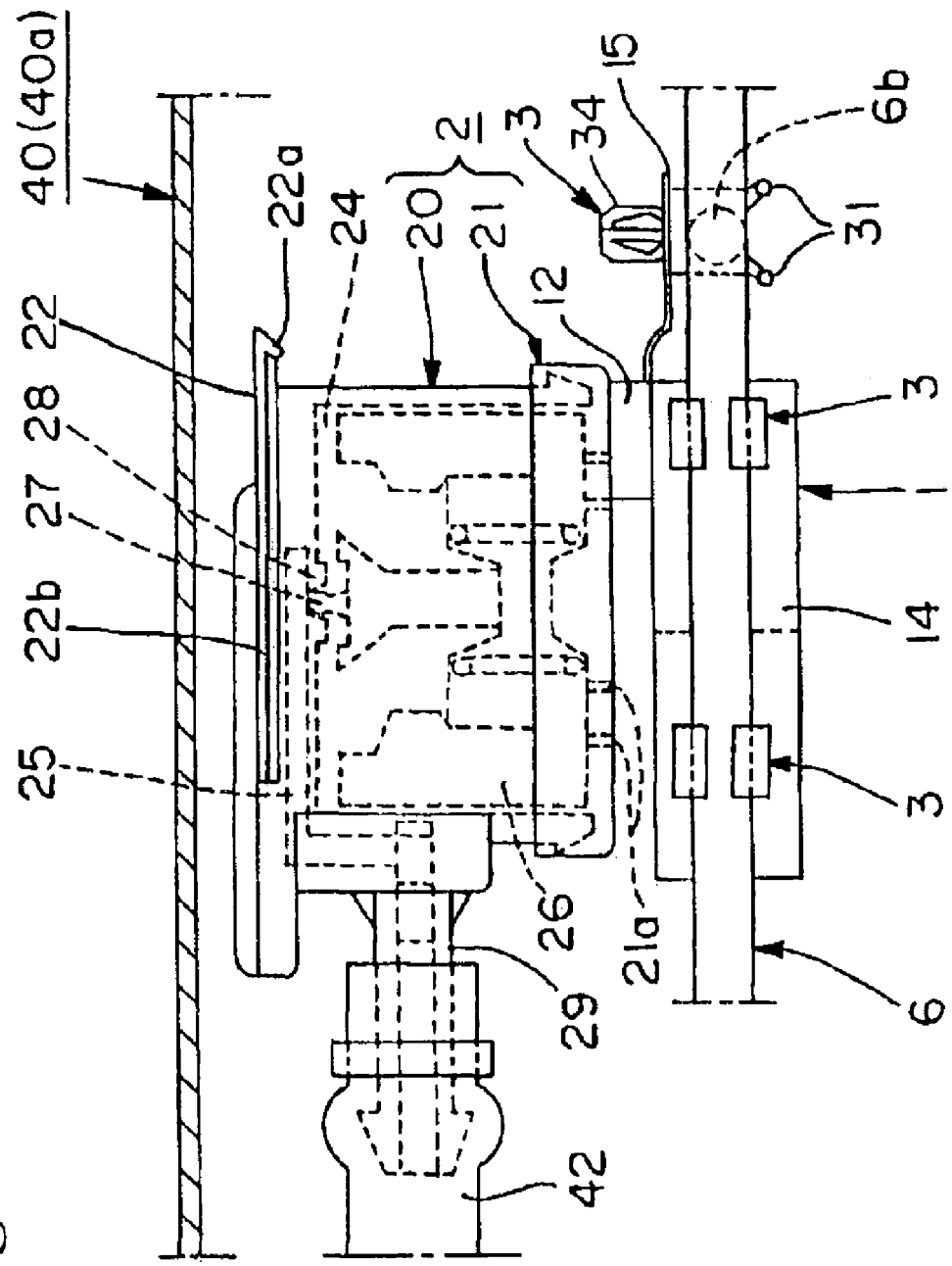
FIG. 1 is a view showing an essential structure in a state that a valve device is attached according to the present invention.
Figure 2:
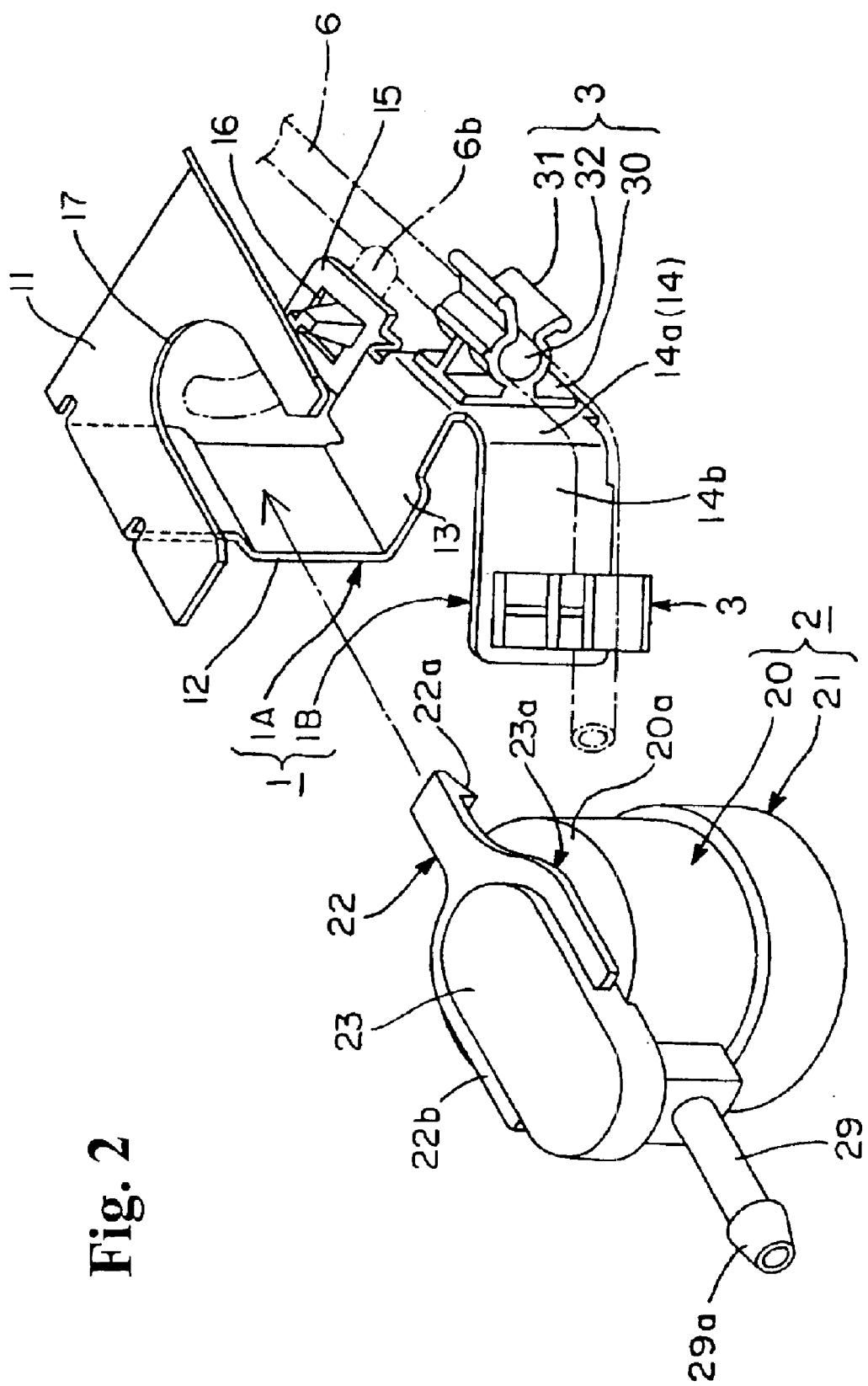
FIG. 2 is an exploded perspective view showing the attaching structure of the valve device shown in FIG. 1.
Figure 3:
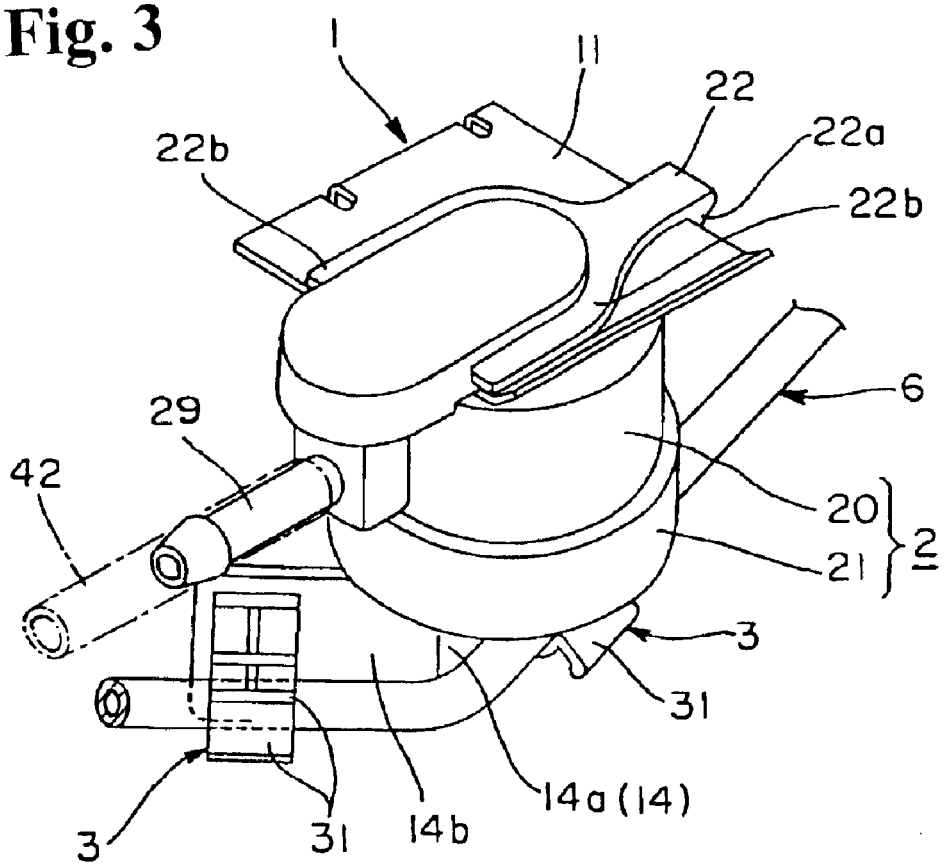
FIG. 3 is a perspective view showing the attaching structure of the valve device shown in FIG. 1.
Figure 4:
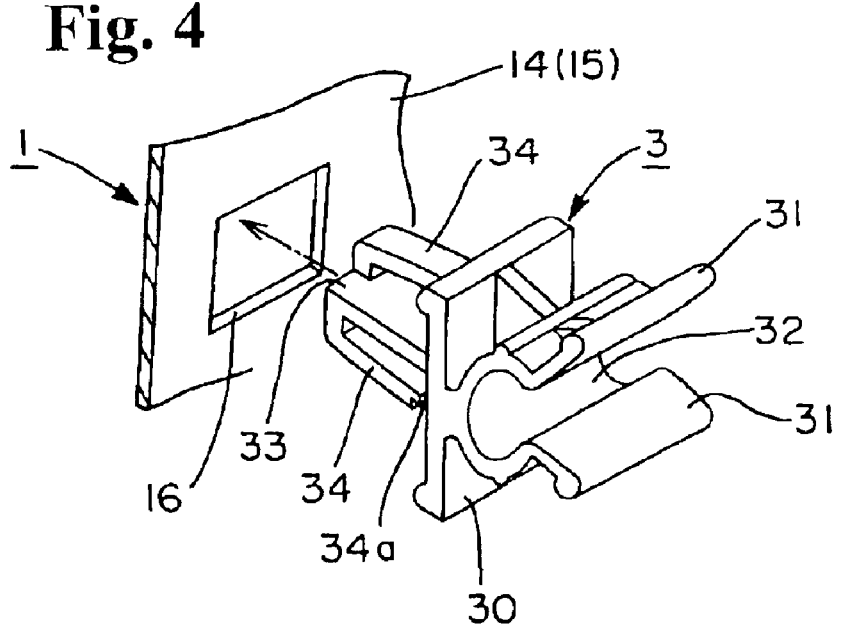
FIG. 4 is a perspective view showing a clip and the like shown in FIG. 1.
Figure 5:
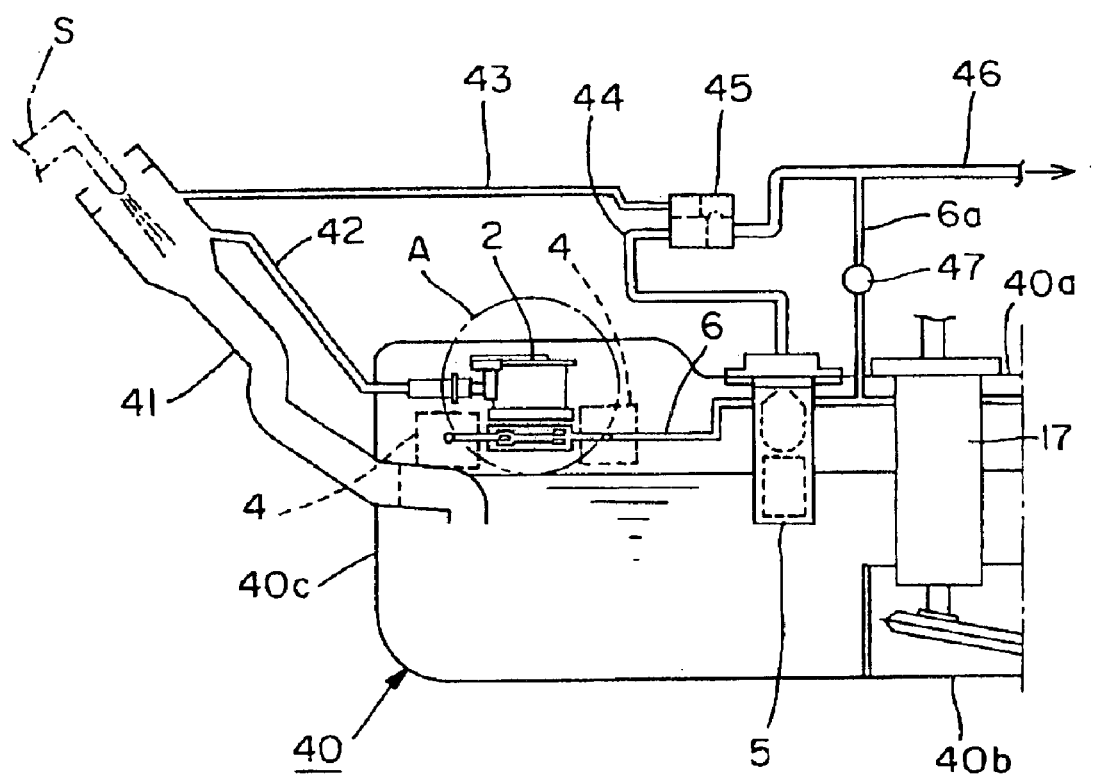
FIG. 5 is a schematic view showing a part of a fuel tank according to the present invention.
Figure 6:
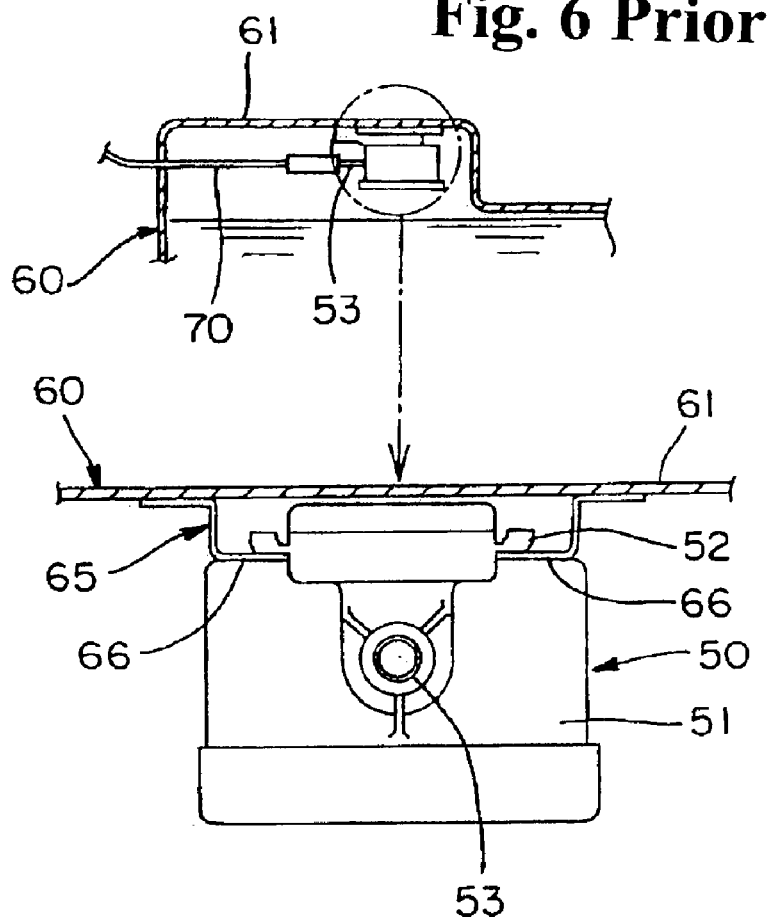
FIG. 6 is a schematic view showing a conventional attaching structure of a valve device.
Figure 7:
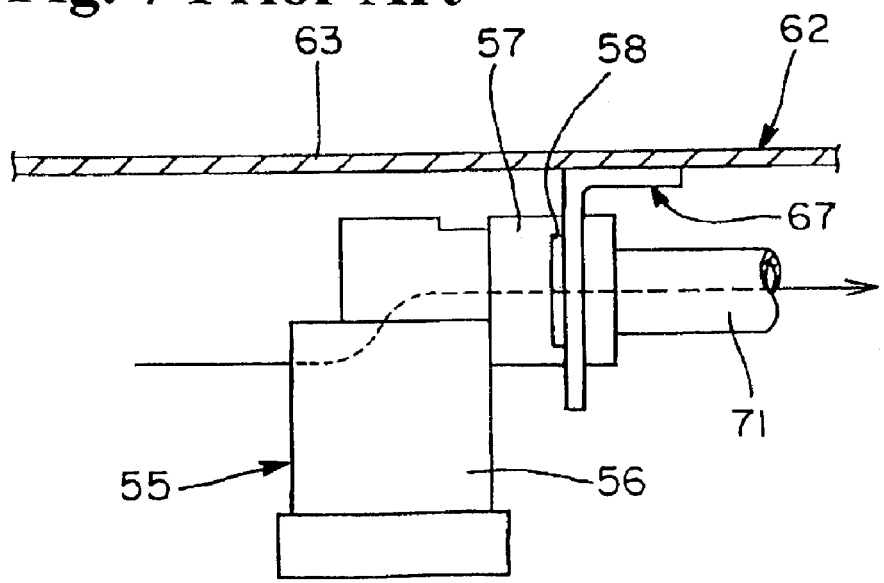
FIG. 7 is a schematic view showing another conventional attaching structure of a valve device.

FIG. 1 is an enlarged view of a circle A shown in FIG. 5; FIG. 2 is a perspective view showing an essential part of a valve device and a relationship between the valve device and a bracket; FIG. 3 is a perspective view showing the valve device in an attached state; and FIG. 4 is a perspective view showing a relationship between the bracket and a clip.

A fuel tank 40 shown in FIG. 5 is a metal tank to be installed to a vehicle, as an example. As a subject of the invention, it is sufficient as far as a fuel tank includes valve devices 2, 4, 5 disposed at an upper inside portion thereof and a pipe and other functional components therein. There is no restriction to a usage and a material.

The fuel tank 40 as shown in FIG. 5 includes upper and lower surfaces 40a, 40b; both side surfaces 40c; and front and rear surfaces to form a substantially flat rectangular three dimensional shape. In the tank, there are disposed the valve device 2 at a side portion with one higher step, a plurality of the valve devices 4, a pipe 6 for connecting the respective valve deices 4, the valve device 5 disposed at a central portion with one lower step, and a pump module 17.

Among the valve devices mentioned above, the valve device 2 (with a cut valve or a similar structure) is attached to the pipe 6. The respective valve devices 4 (with a cut valve structure), for example, are formed of a plurality (four in this embodiment) of the valve devices disposed at one higher step on the front and rear portions of the tank at both sides. An exhaust outlet of each of the valve devices is connected to the pipe 6.

A supporting tool supports the pipe 6 on the upper surface 40a of the tank. A part of the pipe 6 is led out to the outside from an appropriate position of the upper surface 40a, and a lead-out pipe 6a is connected to a pipe 46 (described later). A reference numeral 47 represents a check valve disposed at the middle of the lead-out pipe 6a. The valve device 5 (with a vent valve structure) is attached to the upper surface 40a and connected to a canister (not shown) through a pipe 44, a differential pressure regulating valve 45, a pipe 46 and the like. The pump module 17 is attached to a substantially central portion of the upper surface 40a for supplying the fuel in the tank under pressure to a carburetor through a fuel pipe and the like.

A filler pipe 41 and a tube 42 (breather tube) for connecting an upper portion of the filler pipe 41 to the inside of the fuel tank 40 are disposed on the side surface 40c of the fuel tank 40. The filler pipe 41 is a fuel supply pipe provided with an opening and closing cap for supplying the fuel through a nozzle S, and is connected to a pipe 43 at a side of the fuel supply port. The pipe 43 extends from a side above a lead-out end of the tube 42, and is connected to the differential pressure regulating valve 45.

In the fuel tank 40 as described above, according to the attaching structure of the invention, the valve device 2 is attached to the pipe 6 as a functional component through a bracket 1. In the attaching structure, the relationships between the bracket 1 and the valve device 2 and between the bracket 1 and the pipe 6 are critical. The pipe 6 is made of metal, includes a pipe 6b branched from a part thereof as shown in FIG. 2, and is communicated with the exhaust out-let (for example, a portion corresponding to the connecting pipe portion of the valve device 2) of each valve device 4 disposed in the fuel tank 40.

The bracket 1 is a thin metal plate made by pressing, and includes a main portion 1A having a substantially U-character shape as shown in FIG. 2 and a connecting portion 1B connected to a lower portion of the U-character shape of the main portion 1A. The main portion 1A is made corresponding to the valve device 2. In the present embodiment, the main portion 1A is formed of an upper horizontal plate portion 11, a connecting plate portion 12 formed by bending downward one side of the upper horizontal plate portion 11, and a lower horizontal plate portion 13 formed by bending a lower side of the connecting plate portion 12 substantially parallel to the upper horizontal plate portion 11.

The connecting portion 1B is designed to correspond to the pipe 6. In the present embodiment, the connecting portion 1B is formed of a vertical plate portion 14 formed by bending a forward end of the lower horizontal plate portion 13 substantially vertically downward, and a horizontal plate portion 15 formed by extending one side end of the lower horizontal plate portion 13. The vertical plate portion 14 is gently bent corresponding to the pipe 6 to constitute front and rear plate portions 14a, 14b. The interior of the U-character shape of the main portion 1A has an enough space for accommodating the valve device 2.

The upper horizontal plate portion 11 is provided with an engagement opening 17 extending from one side to the other side thereof. The vertical plate portion 14 and the horizontal plate portion 15 are provided with a plurality of engagement holes 16 having a substantially rectangular shape, as shown in FIG. 4. In the present embodiment, three engagement holes are provided at the front and rear plate portions 14a, 14b and the horizontal plate portion 15.

A clip 3 is provided at the engagement hole 16. The clip 3 includes a pair of holding pieces 31 and a pair of engaging legs 34 on the front and rear surfaces of a plate main portion 30. The plate main portion 30 is a stopping plate abutting against the engagement hole 16. Each of the holding pieces 31 projects from a front surface of the plate main portion 30 to move laterally for holding the pipe 6 or the pipe 6b therebetween. Each of the engaging legs 34 is disposed on a rear surface of the plate main portion 30, and the respective engaging legs 34 project obliquely toward the plate main portion 30 from both forward end sides of a wall 33 projecting from the central portion of the plate main portion 30.

The clip 3 is mounted to the bracket 1 by pushing the engaging legs 34 into the engagement hole 16. In the mounted state, the holding pieces 31 project from the corresponding surface of the bracket 1 as a unit. The bracket 1 is detachably attached to the corresponding portions of the pipe 6 and the pipe 6b branched from the pipe 6 through a plurality of the clips 3. Therefore, the bracket 1 is stably attached to the pipe 6 and the pipe 6b with a predetermined strength in a stand-up state.

The valve device 2 is detachably attached to the engagement portion 17 of the bracket 1. The valve device 2 includes a housing 20 with a lower lid 21; a connecting pipe portion 29 (with a claw 29a at a forward end thereof) projecting from a side surface of the housing 20; an oval shape expanded portion 23 projecting from an upper surface 20a; and an engagement portion 22 integrally formed on both sides of the expanded portion 23.

The engagement portion 22 includes flange portions 22b extending along a periphery of the expanded portion 23 to form a space 23a with respect to the upper surface 20a of the housing 20, and a claw portion 22a facing downward and provided at a forward end of a projecting piece integrated with the flanges 22b at a side opposite to the connecting pipe portion 29.

When the valve device 2 is pushed into the engagement portion 17 of the bracket 1 as shown in an arrow direction in FIG. 2, the corresponding opening edge of the engagement portion 17 enters the space 23a and the claw portion 22a abuts against the corresponding portion of the opening. When the valve device 2 is further pushed in the same direction, after the claw portion 22 elastically moves on the upper surface of the upper horizontal plate portion 11 and reaches the corresponding end of the upper horizontal plate portion 11, the claw portion 22 restores to thereby engage the corresponding end.

Accordingly, the valve device 2 is mounted to the bracket 1 with a predetermined strength as shown in FIG. 3. In the structure of the present embodiment, the valve device 2 is held in a state that the device enters the U-character shape portion of the main portion 1A. The vertical plate portion 14 projects under the valve device 2, and the horizontal plate portion 15 projects in the lower lateral direction. In other words, the clip 3 is attached to or detached from the pipe 6 without any obstacles.

Incidentally, the valve device 2 has a valve opening and closing structure same as that of Japanese Patent Publication No. 7-35255. In other words, the housing 20 includes an exhausting space 25 disposed at an upper portion and separated from a lower space 24; a float 26 disposed in the lower space 24 and urged by a reinforcing spring; a valve head 27 vertically movable according to the float 26; and a valve opening 28 for communicating between the lower space 24 and the exhausting space 25 and being opened/closed by the valve head 27.

With respect to an operation, the valve is normally, for example, in an open state in which, in order to maintain the pressure in the tank at a predetermined value, fuel vapor (pressure) is discharged through through-holes 21a of the lower lid 21, lower space 24, exhausting space 25, connecting pipe portion 29, tube 42, upper portion of the filler pipe 41 and a pipe 43. When a pressure in the fuel tank 40 is rapidly increased due to a rising fuel level upon fueling, the float 26 is elevated by the fuel vapor (pressure) and fuel introduced from the through-holes 21a of the lower lid 21 to close the valve. The valve may have a different opening-closing structure other than this structure.

According to the attaching structure described above, it is expected to attain the following operations and advantages. First, in the present attaching structure, there is no restriction with respect to the time when the valve device 2 is attached to the fuel tank 40. In other words, it is possible to select an assembly process between a process in which after the bracket 1 is attached to the pipe 6, the valve device 2 is attached to the bracket 1; and a process in which after the valve device 2 is attached to the bracket 1, the valve device 2 is attached to the pipe 6 through (the clip 3 of) the bracket 1.

Second, the valve device 2 is attached to the pipe 6. Therefore, with respect to the structure of the tank, it is possible to design the shape of the tank upper surface 40a independent of the valve device 2, thereby alleviating the restriction with respect to the shape of the upper surface 40a of the fuel tank 40.

Third, in the present attaching structure, as described above, the valve device 2 is attached to the bracket 1 through the engagement between the engaging portion 22 and the engagement portion 17. The bracket 1 is attached to the pipe 6 through the clip 3. Therefore, it is not necessary to use any special attaching tool as in the conventional welding or fusing method, and there is no risk of damaging the tank, thereby improving the working efficiency.

Fourth, in the present attaching structure, the above-described engagement structure is employed. Therefore, when the device is removed in the tank assembling process due to low quality in inspection, the valve device 2 has to be removed at the maintenance operation, or components are selectively recovered in an operation of scrapping the tank. Thus, it is easy to separate the valve device 2 and the bracket 1.

Fifth, in the present structure, the valve device 2 is stably held in a state that the valve device 2 is attached to the pipe 6 through the bracket 1. Therefore, as opposed to the conventional structure where the valve device is directly mounted on the upper surface of the tank or fixed thereto through the bracket, the present structure is hardly affected by the vehicle vibrations. The present invention can be also applied to the valve device disclosed in Japanese Patent Publication No. 7-35255, i.e. the conventional device, by just changing the bracket 1.

Incidentally, the present invention is not limited to the above embodiment, and various modifications can be made except for the subject matter defined in claims. For example, instead of the pipe 6, the valve device 2 may be attached to the other pipe or an end side in the tank of the filler pipe 41.

As described hereinabove, according to the attaching structure of the invention, the valve device is detachably attached to the functional component disposed at an upper portion in the fuel tank. Therefore, the problems discussed before are solved; the attaching workability is greatly improved; the maintaining ability is superior; the installation flexibility is increased; and the separating work when the fuel tank is scrapped is facilitated.

Lately, there have been trends in which the shape of the fuel tank becomes more complicated, the number of the valve devices increases, and the pipe system in the tank becomes more complicated. The attaching structure of the invention can be applied to valve devices other than that of the embodiment, thereby improving a quality of the fuel tank.

While the invention has been explained with reference to the specific embodiments of the invention, the explanation is illustrative and the invention is limited only by the appended claims.

What is claimed is:

1. An attaching structure for attaching a valve device to a fuel tank, comprising:
    a functional component fixed inside the fuel tank, and
    a bracket having a first attaching portion attached to the functional component and a second attaching portion for receiving the valve device therein so that the valve device is attached to the fuel tank through the bracket attached to the functional component which is fixed to the fuel tank.

2. An attaching structure according to claim 1, wherein said functional component is a metal pipe disposed inside the fuel tank.

3. An attaching structure according to claim 1, wherein said bracket is an elastic bracket for attaching the valve device to the functional component.

4. An attaching structure according to claim 1, wherein said bracket is flexible, and the first attaching portion is detachable with respect to the functional component.

5. An attaching structure according to claim 1, wherein said first attaching portion includes a hole formed in the bracket, and a clip detachably engaging the hole and the functional component.

6. An attaching structure according to claim 5, wherein said clip includes a pair of holding pieces for holding a pipe as the functional component, and a pair of engaging legs formed at a side opposite to the holding pieces and engaging the hole.

7. An attaching structure for attaching a valve device to a fuel tank, comprising:
    a functional component fixed inside the fuel tank, and
    an attaching device attached to the functional component and having a portion for receiving the valve device thereto, said attaching device including a horizontal plate portion and a vertical plate portion connected to the horizontal plate portion, one of said horizontal plate portion and vertical plate portion including an engagement portion detachably engaging the valve device, the other of said horizontal plate portion and vertical plate portion including a connecting portion detachably connected to the functional component.

8. An attaching structure according to claim 7, further comprising a plurality of clips attached to the attaching device to connect the attaching device to the functional component.

9. An attaching structure for a fuel tank, comprising:
    a valve device located inside an upper portion of the fuel tank, and having a connecting pipe portion for communicating the valve device between an inside and an outside of the fuel tank therethrough, said valve device being closed when a fuel level of the fuel tank increases to a predetermined level,
    a functional component fixed inside the fuel tank, and
    a bracket having a first attaching portion attached to the functional component and a second attaching portion for receiving the valve device therein so that the valve device is attached to the fuel tank through the bracket attached to the functional component which is fixed to the fuel tank.

10. An attaching structure according to claim 9, wherein said connecting pipe portion is connected to an end of a tube communicating between an upper portion of a fuel filler pipe installed in the fuel tank and an inside of the fuel tank.

* * * * *